United States Patent
Morii

(10) Patent No.: US 9,623,862 B2
(45) Date of Patent: Apr. 18, 2017

(54) CONTROL DEVICE FOR CONTROLLING CONVERTER

(71) Applicant: DENSO CORPORATION, Kariya, Aichi-pref. (JP)

(72) Inventor: Akiyoshi Morii, Kariya (JP)

(73) Assignee: DENSO CORPORATION, Kariya (JP)

( * ) Notice: Subject to any disclaimer, the term of this patent is extended or adjusted under 35 U.S.C. 154(b) by 33 days.

(21) Appl. No.: 14/644,572

(22) Filed: Mar. 11, 2015

(65) Prior Publication Data

US 2015/0258900 A1 Sep. 17, 2015

(30) Foreign Application Priority Data

Mar. 12, 2014 (JP) ................. 2014-048954

(51) Int. Cl.
*B60W 10/10* (2012.01)
*B60W 10/08* (2006.01)
(Continued)

(52) U.S. Cl.
CPC ............. *B60W 10/08* (2013.01); *B60K 6/445* (2013.01); *B60L 3/0046* (2013.01); *B60L 3/04* (2013.01); *B60L 7/14* (2013.01); *B60L 11/123* (2013.01); *B60L 11/14* (2013.01); *B60L 11/1857* (2013.01); *B60L 11/1861* (2013.01); *B60L 15/007* (2013.01); *B60L 15/20* (2013.01); *B60L 15/2009* (2013.01); *B60W 10/06* (2013.01); *B60W 10/26* (2013.01); *B60W 20/14* (2016.01); *B60L 2210/10* (2013.01); *B60L 2210/40* (2013.01); *B60L 2240/12* (2013.01); *B60L 2240/36* (2013.01); *B60L 2240/421* (2013.01); *B60L 2240/423* (2013.01); *B60L 2240/441* (2013.01); *B60L 2240/443* (2013.01); *B60L 2240/545* (2013.01); *B60L 2240/547* (2013.01);
(Continued)

(58) Field of Classification Search
USPC ................ 307/31, 35; 290/31, 32, 34, 36 R; 903/930, 906, 910; 180/65.28; 701/22, 701/53, 54
See application file for complete search history.

(56) References Cited

U.S. PATENT DOCUMENTS 9,045,132 B1 * 6/2015 Zhao .................... F02N 11/0825
2002/0079147 A1 * 6/2002 Yamaguchi ............ B60K 6/445
180/65.235

(Continued)

FOREIGN PATENT DOCUMENTS

JP 2009-196415 9/2009
JP 2010-098882 4/2010

Primary Examiner — Thomas Tarcza
Assistant Examiner — Richard Goldman
(74) Attorney, Agent, or Firm — Nixon & Vanderhye P.C.

(57) ABSTRACT

In a control device, a control unit controls at least one switching element of a converter to increase a voltage supplied from a battery, thus outputting the increased voltage to a rotating electrical machine. The rotating electrical machine is capable of driving, based on the increased voltage output from the converter, an internal combustion engine, and capable of charging the battery based on torque supplied from the internal combustion engine. A limit unit limits, based on a change of an available maximum output of the internal combustion engine, the increased voltage output from the converter to be equal to or lower than a predetermined upper limit.

8 Claims, 10 Drawing Sheets

(51) Int. Cl.
  *B60L 11/14*   (2006.01)
  *B60K 6/445*   (2007.10)
  *B60W 10/06*   (2006.01)
  *B60W 10/26*   (2006.01)
  *B60W 20/14*   (2016.01)
  *B60L 3/00*    (2006.01)
  *B60L 3/04*    (2006.01)
  *B60L 7/14*    (2006.01)
  *B60L 11/12*   (2006.01)
  *B60L 11/18*   (2006.01)
  *B60L 15/00*   (2006.01)
  *B60L 15/20*   (2006.01)
  *F02N 11/08*   (2006.01)
  *F02N 11/04*   (2006.01)

(52) U.S. Cl.
  CPC ..... *B60L 2240/549* (2013.01); *B60L 2260/44* (2013.01); *B60L 2270/12* (2013.01); *F02N 11/04* (2013.01); *F02N 11/0862* (2013.01); *F02N 2011/0896* (2013.01); *Y02T 10/6217* (2013.01); *Y02T 10/6239* (2013.01); *Y02T 10/6286* (2013.01); *Y02T 10/645* (2013.01); *Y02T 10/7005* (2013.01); *Y02T 10/705* (2013.01); *Y02T 10/7044* (2013.01); *Y02T 10/7077* (2013.01); *Y02T 10/7216* (2013.01); *Y02T 10/7241* (2013.01); *Y02T 10/7275* (2013.01)

(56)  References Cited

U.S. PATENT DOCUMENTS

| | | | | |
|---|---|---|---|---|
| 2005/0060076 | A1* | 3/2005 | Phillips | B60K 6/44 701/51 |
| 2005/0060080 | A1* | 3/2005 | Phillips | B60K 6/44 701/54 |
| 2006/0097671 | A1* | 5/2006 | Yoshida | B60K 6/48 318/109 |
| 2011/0130904 | A1* | 6/2011 | McGrogan | B60W 30/1846 701/22 |
| 2012/0209463 | A1* | 8/2012 | Gibbs | B60K 6/46 701/22 |
| 2012/0283067 | A1* | 11/2012 | Roos | B60W 10/06 477/100 |
| 2013/0030633 | A1* | 1/2013 | Yamamoto | B60W 10/08 701/22 |
| 2013/0035839 | A1* | 2/2013 | Otanez | F02N 11/0837 701/102 |
| 2013/0054060 | A1* | 2/2013 | Dupuy | F02D 17/04 701/22 |
| 2013/0073136 | A1* | 3/2013 | Yamamoto | B60K 6/445 701/22 |
| 2013/0260957 | A1* | 10/2013 | Ueda | B60K 6/52 477/5 |
| 2014/0045655 | A1* | 2/2014 | Goh | B60W 10/04 477/184 |
| 2014/0163794 | A1* | 6/2014 | Park | B60W 20/40 701/22 |
| 2014/0172214 | A1* | 6/2014 | Kim | B60W 20/10 701/22 |
| 2015/0032316 | A1* | 1/2015 | Chin | B60K 6/52 701/22 |
| 2015/0097432 | A1* | 4/2015 | Gurin | H02P 9/008 307/31 |
| 2015/0175149 | A1* | 6/2015 | Zhao | B60W 20/00 701/22 |
| 2015/0258900 | A1* | 9/2015 | Morii | B60W 20/14 290/16 |
| 2016/0001763 | A1* | 1/2016 | Ehrlich | B60W 50/10 701/22 |
| 2016/0009270 | A1* | 1/2016 | Zhang | B60K 6/48 477/5 |

\* cited by examiner

CONTROL DEVICE FOR CONTROLLING CONVERTER

CROSS REFERENCE TO RELATED APPLICATION

This application is based on and claims the benefit of priority from Japanese Patent Application No. 2014-48954 filed on Mar. 12, 2014, the disclosure of which is incorporated in its entirety herein by reference.

TECHNICAL FIELD

The present disclosure relates to a control device, and more particularly, to a control device to control a converter for increasing a voltage from a battery.

BACKGROUND

A control device is known that controls a converter which increases a voltage from a battery, and outputs the voltage to two rotating electrical machines. For instance, such a control device is described in patent document 1 which is Japanese Patent Laid-Open No. 2010-98882. The control device is installed in a vehicle which is equipped with a battery, a first rotating electrical machine, a second rotating electrical machine, an inverter, and a converter. The control device described in patent document 1 outputs an increased voltage from the battery to the first rotating electrical machine and the second rotating electrical machine via the inverter.

SUMMARY

The first rotating electrical machine described in patent document 1 is capable of running on power from the battery, and is capable of producing rotational driving force to operate an internal combustion engine of a vehicle, which is a power-running operation.

Additionally, the first rotating electrical machine described in patent document 1 is capable of generating electrical power to charge the battery using rotational power of the internal combustion engine, which is a regenerative operation.

The second rotating electrical machine described in patent document 1 is also capable of running on power from the battery, and is capable of producing rotational driving force to rotate wheels of the vehicle, which is a power-running operation. In addition, the second rotating electrical machine described in patent document 1 is capable of generating electrical power to charge the battery by utilizing rotational power of the wheels, which is a regenerative operation.

The control device described in patent document 1 reduces a maximum output value of a voltage to be supplied to each of the first and second rotating electrical machines from the converter via the inverter when the control device detects a reduction in the maximum output voltage of the battery. This reduction prevents the converter from increasing a voltage higher than a voltage usable based on the maximum output voltage of the battery. Hence, the control device described in patent document 1 reduces switching losses and power losses of the converter and inverter, thus improving fuel economy of the vehicle.

In the control device described in patent document 1, the regenerative operation of the first rotating electrical machine generates less power when the maximum output of the internal combustion engine reduces. This reduction in power generated by the regenerative operation of the first rotating electrical machine may reduce the maximum output value of the voltage from the battery used by the power-running operation of the second rotating electrical machine.

In view of the reduction in the maximum output of the internal combustion engine, the control device described in patent document 1 may not consider any relationship between the reduction in the maximum output of the internal combustion engine and the maximum output value of the voltage supplied from the converter. For this reason, the control device described in patent document 1 may not sufficiently reduce the switching losses and the power losses of the converter when the maximum output of the internal combustion engine reduces. This may make it difficult for the control device described in patent document 1 to sufficiently improve fuel economy of the vehicle.

In view the circumstances set forth above, one aspect of the present disclosure seeks to provide control devices for controlling a converter based on output of an internal combustion engine, each of which is capable of addressing the problem set forth above.

Specifically, an alternative aspect of the present disclosure aims to provide such control devices, each of which is capable of reducing switching loses and power loses of the converter when a maximum value of the output of the internal combustion engine reduces.

According to a first exemplary aspect of the present disclosure, there is provided a control device. The control device includes a control unit controlling at least one switching element of a converter to increase a voltage supplied from a battery, thus outputting the increased voltage to a rotating electrical machine. The rotating electrical machine is capable of driving, based on the increased voltage output from the converter, an internal combustion engine, and is capable of charging the battery based on torque supplied from the internal combustion engine. The control device includes a second control unit limiting, based on a change of an available maximum output of the internal combustion engine, the increased voltage output from the converter to be equal to or lower than a predetermined upper limit.

According to a second exemplary aspect of the present disclosure, there is provided a vehicle control system. The vehicle control system includes a battery, an axle, an internal combustion engine for rotatably driving the axle, a converter including at least one switching element, a first rotating electrical machine, and a second rotating electrical machine. The vehicle control system includes a control unit controlling the at least one switching element of the converter to increase a voltage supplied from the battery, thus outputting the increased voltage to each of the first and second rotating electrical machines. The first rotating electrical machine is capable of driving, based on the increased voltage output from the converter, the internal combustion engine, and is capable of charging the battery based on torque supplied from the engine. The second rotating electrical machine is capable of driving, based on the increased voltage output from the converter, the axle, and is capable of charging the battery based on torque supplied from the axle. The vehicle control system includes a limit unit limiting, based on a change of an available maximum output of the internal combustion engine, the increased voltage output from the converter to be equal to or lower than a predetermined upper limit.

The limit unit of the control device according to each of the first and second exemplary aspects limits, based on a change of the available maximum output of the internal combustion engine, the increased voltage output from the converter to be equal to or lower than the predetermined upper limit. This permits the converter to increase the voltage supplied from the battery such that the increased voltage does not exceed the predetermined upper limit based on the change of the available maximum output of the internal combustion engine. This reduces switching losses of the at least one switching element of the converter when the available maximum output of the internal combustion engine reduces, thus reducing power loses of the converter.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
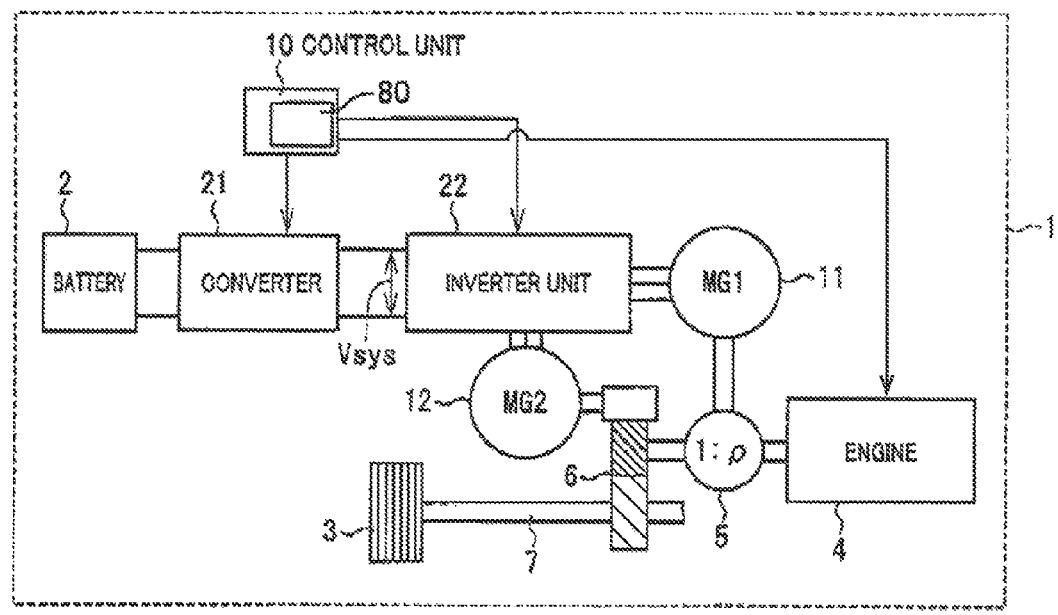
FIG. 1 is a schematic diagram illustrating a vehicle control system installed in a vehicle and including a control device according to an embodiment of the present disclosure.

A specific embodiment of the present disclosure will be described hereinafter with reference to the accompanying drawings. In the embodiment and its modifications, like parts between the embodiments, to which like reference characters are assigned, are omitted or simplified in order to eliminate redundant description.

FIG. 1 is a circuit diagram schematically illustrating a control device applied to a vehicle control system CS installed in a vehicle 1 according to an embodiment of the present disclosure.

The vehicle control system CS installed in the vehicle 1 is equipped with a battery 2, wheels 3, an engine 4, as an internal combustion engine, and a power split/integration device 5, a gear mechanism 6, and an axle 7.

The vehicle control system CS is also equipped with a first rotating electrical machine 11, a second rotating electrical machine 12, a converter 21, and an inverter unit 22.

The vehicle control system CS is further equipped with an electronic control unit 10, referred to as an ECU, and others; the control unit 10 serves as, for example, the control device according to the embodiment. In some figures, the first and second rotating electrical machines 11 and 12 are illustrated as MG1 and MG2, respectively.

The vehicle 1 is for instance, a hybrid vehicle driven by torque which is an output from at least one of the engine 4, the first rotating electrical machine 11, and the second rotating electrical machine 12; these apparatuses 4, 11, and 12 serve as several different power sources installed in the vehicle 1.

The engine 4 is, for instance, a four-cylinder gasoline engine driven by gasoline as a fuel, and outputs torque from a crankshaft of the engine 4. The first rotating electrical machine 11 and the second rotating electrical machine 12 are electric motors outputting torque.

Each of the first and second rotating electrical machines 11 and 12 performs the power-running operation based on power, i.e., AC power supplied from the inverter unit 22 based on power, i.e. DC power, supplied from the battery 2 that serves as a power source installed in the vehicle 1, thus outputting torque, i.e., rotating power via a rotor thereof.

Additionally, the first rotating electrical machine 11 and the second rotating electrical machine 12 also function as generators which are capable of performing the respective regenerative operations based on input torque, thus charging the battery 2. Hence, the first rotating electrical machine 11 and the second rotating electrical machine 12 are so-called motor-generators. In the embodiment, the first rotating electrical machine 11 and the second rotating electrical machine 12 are for example designed as three-phase brushless motors.

The power split/integration device 5 is installed among the engine 4, the first rotating electrical machine 11 and the second rotating electrical machine 12 in order to split or integrate input power. The power split/integration device 5 has a planetary gear mechanism, i.e., an epicyclic gear mechanism. For instance, the planetary gear mechanism is comprised of a sun gear, one or more pinion gears, a ring gear, and a carrier. The ring gear is provided to surround the outer circumferential surface of the sun gear to be concentrically arranged with the sun gear. The one or more pinion gears are arranged between the sun gear and the ring gear to be engaged with both the sun gear and the ring gear such that each pinion gear orbits the sun gear while rotating on an axis thereof. The carrier supports the axes of the one or more pinion gears.

The sun gear is coupled to the first rotating machine 11, i.e., its rotor via, a rotating shaft. The carrier, which causes the pinion gears to orbit the sun gear, is coupled to the engine 4, i.e., a crankshaft of the engine 4. The ring gear is coupled to the axle 7 via the gear mechanism 6, and coupled to the second rotating electrical machine 12, i.e., its rotor via a rotating shaft and the gear mechanism 6. The wheels 3 are respectively attached to opposite ends of the axle 7. The planetary gear mechanism has a gear ratio, i.e., a planetary-gear ratio, of the number of teeth of the ring gear to the number of teeth of the sun gear set to, for example, 1:ρ. In other words, the planetary-gear ratio of the number of teeth of the sun gear to the number of teeth of the ring gear is set to ρ/1.

The gear mechanism 6 transmits outputs from the power split/integration device 5 and the second rotating electrical machine 12 to the axle 7. A gear ratio of the gear mechanism 6 is fixed.

The engine 4 rotates the first rotating electrical machine 11, so that the first rotating electrical machine 11 mainly serves as a generator. Specifically, the first rotating electrical machine 11 charges the battery 2 with generated power via a first inverter 40 of the inverter unit 22 and the converter 21. Since the engine 4 is capable of charging the battery 2 by rotating the first rotating electrical machine 11, the engine 4 is considered to be another power source. Therefore, the vehicle 1 is equipped with two power sources, i.e., the battery 2 and the engine 4.

Additionally, the first rotating electrical machine 11 is capable of performing the power-running operation based on power supplied from the battery 2 via the converter 21 and the first inverter 40, thus rotatably driving the engine 4. Hence, the first rotating electrical machine 11 serves as a starter for rotatably driving the engine 4.

The second rotating electrical machine 12 is mainly utilized for driving of the vehicle 1. The second rotating electrical machine 12 is capable of producing rotational driving force to the wheels 3 by performing the power-running operation using power supplied from the battery 2 via the converter 21 and a second inverter 60 of the inverter unit 22. Additionally, the second rotating electrical machine 12 functions as a generator while the vehicle 1 is braked. The second rotating electrical machine 12 performs the regenerative operation based on torque supplied from the rotating wheels 3, thus charging the battery 2.

Figure 2:
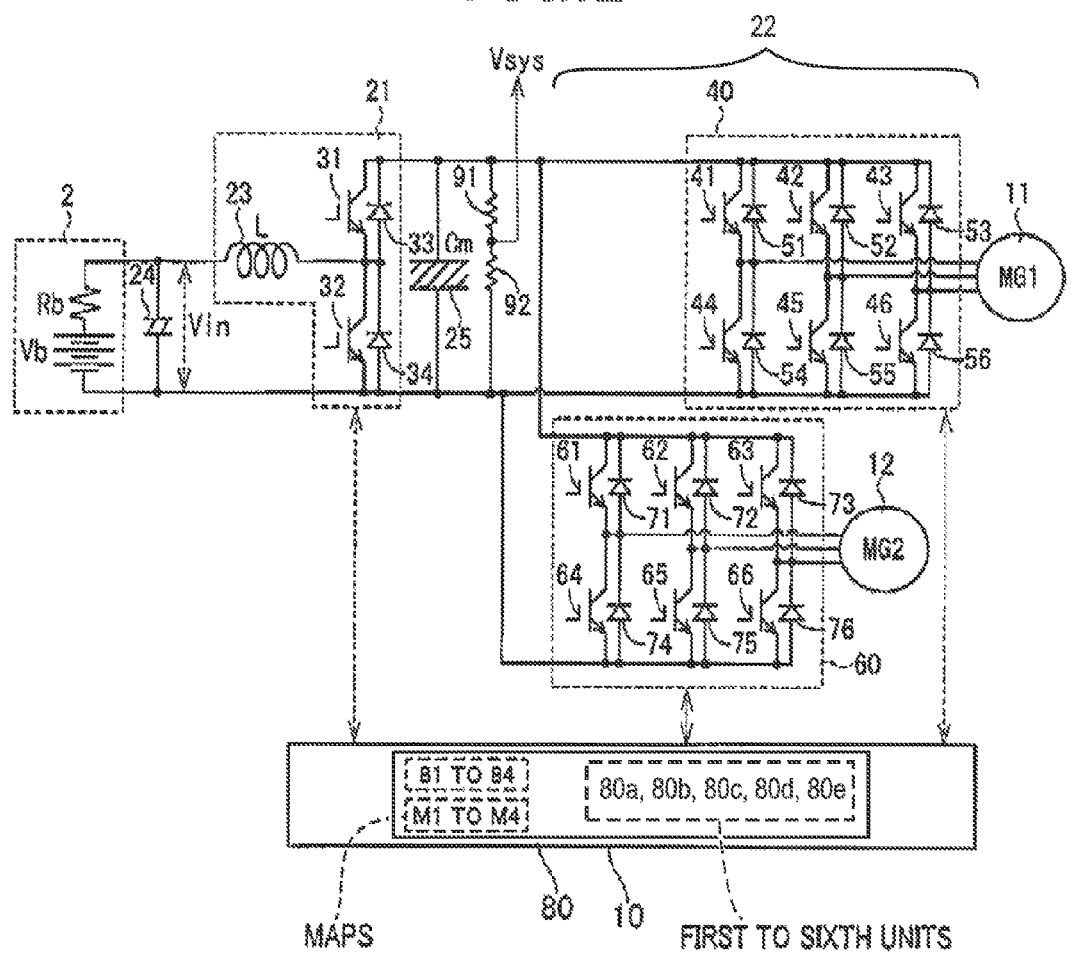
FIG. 2 is a circuit diagram schematically illustrating the control device, and a converter and an inverter unit controllable by the control device according to the embodiment of the present disclosure.

As illustrated in FIG. 2, the converter 21 has an inductor 23 with a predetermined inductance L, a switching element 31, a switching element 32, a rectifying device 33, and a rectifying device 34.

One end of the inductor 23 is connected to a positive terminal of the battery 2. The switching element 31 and the switching element 32 are for instance, semiconductor switching elements such as IGBTs and others. In the embodiment, an IGBT is used for each of the switching elements 31 and 32. An emitter of the switching element 31 is connected to a collector of the switching element 32. A connecting point of the switching element 31 and the switching element 32 is connected to another end of the inductor 23. A collector of the switching element 31 is connected to positive terminals of the first inverter 40 and the second inverter 60. An emitter of the switching element 32 is connected to negative terminals of the first inverter 40 and the second inverter 60. Gates of the switching element 31 and the switching element 32 are connected to signal wires of a control unit 80, which will be described later.

The rectifying device 33 is for instance, a diode. An anode of the rectifying device 33 is connected to the emitter of the switching element 31, and a cathode of the rectifying device 33 is connected to the collector of the switching element 31. The rectifying device 34 is for instance, a diode. An anode of the rectifying device 34 is connected to the emitter of the switching element 32, and a cathode of the rectifying device 34 is connected to the collector of the switching element 32.

In the embodiment, a capacitor 24 is disposed between the battery 2 and the inductor 23 and connected in parallel to the battery 2. A capacitor 25 is disposed between the converter 21 and the inverter unit 22, and connected in parallel to the converter 21. One end of the capacitor 24 is connected to the positive terminal of the battery 2, and another end of the capacitor 24 is connected to a negative terminal of the battery 2. One end of the capacitor 23 is connected to the collector of the switching element 31, and another end of the capacitor 25 is connected to the emitter of the switching element 32. The capacitor 24 is capable of suppressing an input surge voltage from the battery 2 to the converter 21. The capacitor 25 stabilizes an output voltage from the converter 21.

The converter 21 increases a voltage from the battery 2 based on switching operations of the switching element 31 and the switching element 32, and outputs the increased voltage to the positive terminal of the inverter unit 22. Additionally, the converter 21 decreases a voltage from the inverter unit 22, and outputs the decreased voltage to the battery 2. That is, the converter 21 has a function of increasing and reducing a voltage as necessary.

In the embodiment, the converter 21 mainly functions as a booster circuit. Specifically, the converter 21 boosts a voltage from the battery 2, and outputs the boosted voltage to the first rotating electrical machine 11 and the second rotating electrical machine 12 via the inverter unit 22.

The inverter unit 22 includes the first inverter 40 and the second inverter 60. The first inverter 40 has switching elements 41 to 46 and rectifying devices 51 to 56. The switching elements 41 to 46 are for instance, semiconductor switching elements such as IGBTs and others. In the embodiment, an IGBT is used for each of the switching elements 41 to 46.

The emitter of the switching element 41 is connected to the collector of the switching element 44 to constitute a pair of high- and low-side switching elements. The emitter of the switching element 42 is connected to the collector of the switching element 45 to constitute a pair of high- and low-side switching elements. The emitter of the switching element 43 is connected to the collector of the switching element 46 to constitute a pair of high- and low-side switching elements. The collectors of the switching elements 41 to 43 are connected to the positive terminal of the battery 2 via the switching element 31 of the converter 21 and the inductor 23. The emitters of the switching elements 44 to 46 are connected to the negative terminal of the battery 2, i.e., the emitter of the switching element 32 of the converter 21. The gates of the switching element 41 to 46 are connected to signal wires of the control unit 80, which will be described later.

A connecting point of the switching element 41 and the switching element 44 is connected to a U-phase winding of the first rotating electrical machine 11. A connecting point of the switching element 42 and the switching element 45 is connected to a V-phase winding of the first rotating electrical machine 11. A connecting point of the switching element 43 and the switching element 46 is connected to a W-phase winding of the first rotating electrical machine 11.

The rectifying devices 51 to 56 are for instance, diodes. Each anode of the rectifying devices 51 to 56 is connected to the emitter of a corresponding one of the switching element 41 to 46. Each cathode of the rectifying devices 51 to 56 is connected to the collector of a corresponding one of the switching element 41 to 46.

The first inverter 40 converts, based on switching operations of the switching elements 41 to 46, a current from the converter 21 to alternating current, and outputs the alternating current to the first rotating electrical machine 11. Additionally, the first inverter 40 converts, based on switching operations of the switching elements 41 to 46, a current from the first rotating electrical machine 11 to direct current, and outputs the direct current to the converter 21.

The second inverter 60 has switching elements 61 to 66 and rectifying devices 71 to 76. The switching elements 61 to 66 are for instance, semiconductor switching elements such as IGBTs and others. In the embodiment, an MET is used for each of the switching elements 61 to 66.

The emitter of the switching element 61 is connected to the collector of the switching element 64 to constitute a pair of high- and low-side switching elements. The emitter of the switching element 62 is connected to the collector of the switching element 65 to constitute a pair of high- and low-side switching elements. The emitter of the switching element 63 is connected to the collector of the switching element 66 to constitute a pair of high- and low-side switching elements. The collectors of the switching elements 61 to 63 are connected to the positive terminal of the battery 2 via the switching element 31 of the converter 21 and the inductor 23. The emitters of the switching elements 64 to 66 are connected to the negative terminal of the battery 2, i.e., the emitter of the switching element 32 of the converter 21. The gates of the switching element 61 to 66 are connected to signal wires of the control unit 80, which will be described later.

A connecting point of the switching element 61 and the switching element 64 is connected to a U-phase winding of the second rotating electrical machine 12. A connecting point of the switching element 62 and the switching element 65 is connected to a V-phase winding of the second rotating electrical machine 12. A connecting point of the switching element 63 and the switching element 66 is connected to a W-phase winding of the second rotating electrical machine 12.

The rectifying devices 71 to 76 are for instance, diodes. Each anode of the rectifying devices 71 to 76 is connected to the emitter of a corresponding one of the switching element 61 to 66. Each cathode of the rectifying devices 71 to 76 is connected to the collector of a corresponding one of the switching element 61 to 66.

The second inverter 60 converts, based on switching operations of the switching elements 61 to 66, a current from the converter 21 to alternating current, and outputs the alternating current to the second rotating electrical machine 12. Additionally, the second inverter 60 converts, based on switching operations of the switching elements 61 to 66, a current from the second rotating electrical machine 12 to direct current, and outputs the direct current to the converter 21.

The ECU 10 is designed as, for example, a microcomputer which has a. CPU, a ROM, a RAM, an I/O, and others. The ECU 10 performs various tasks in accordance with programs stored in, for example, the ROM and/or the RAM based on signals and others sent from sensors and others installed in the vehicle 1. The tasks control devices and/or actuators installed in the vehicle 1, thus comprehensively controlling the vehicle 1.

Figure 3:
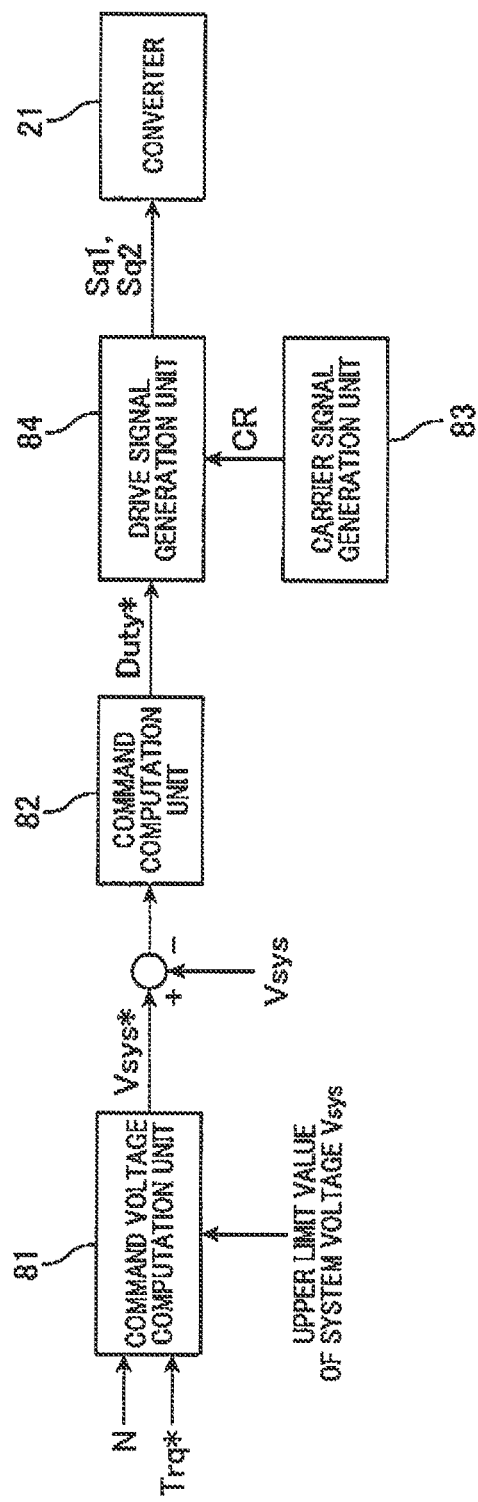
FIG. 3 is a block diagram schematically illustrating a functional configuration of the control unit according to the embodiment of the present disclosure.

The ECU 10 has the control unit 80. As illustrated in FIG. 3, the control unit 80 functionally includes a command-voltage computation unit 81, a command Duty computation unit 82, a carrier signal generation unit 83, a driving signal generation unit 84, and others. In other words, the control unit 80 serves as the functional units 81 to 84 in accordance with the programs stored in the ROM and/or RAM.

In the embodiment, a resistor 91 and a resistor 92 are installed between the converter 21, i.e., the capacitor 25, and the inverter unit 22. One end of the resistance 91 is connected to between one end of the capacitor 25 and the positive terminal of the inverter unit 22. One end of the resistance 92 is connected to the other end of the resistance 91 so as to be connected in series to each other. The other end of the resistance 92 is connected to between the other end of the capacitor 25 and the negative terminal of the inverter unit 22.

The control unit 80 is connected between the resistance 91 and the resistance 92. Thus, the control unit 80 detects a system voltage which is a voltage difference between the positive and the negative terminals of the inverter unit 22. In other words, the system voltage is an output voltage from the converter 21 to the positive terminal of the inverter unit 22, i.e., the first rotating electrical machine 11 and the second rotating electrical machine 12.

That is, the resistance 91 and the resistance 92 serve as a sensor for measuring a value of the system voltage. The system voltage will be referred to as a system voltage Vsys.

The command-voltage computation unit 81 receives request torque Trq* for each of the first and second rotating electrical machines 11 and 12, and receives the current rotational speed, i.e., the number of revolutions per unit time, of each of the first and second rotating electrical machines 11 and 12 supplied from a corresponding one of the first and second rotating electrical machines 11 and 12. Then, the command-voltage computation unit 81 calculates a required value of the system voltage Vsys, which is required for the first and second electric machines 11 and 12 to implement the request torque Trq* at the current rotational speed of each of the first and second rotating electrical machines 11 and 12.

The command-voltage computation unit 81 performs an upper-limit computing task for computing an upper limit value for the system voltage Vsys, and limits the calculated required value of the system voltage Vsys at the upper limit value for the system voltage Vsys, thus computing a command value for the system voltage Vsys. The command value for the system voltage Vsys will be referred to as a system-voltage command value Vsys* hereinafter. The upper-limit computing task for the system voltage Vsys will be described later.

A command duty computation unit 82 performs a feedback control to obtain a command value of duty Duty for the switching element 31 required to converge the deviation between the system-voltage command value Vsys* and a value of the system voltage Vsys presently measured based on the resistances of the resistors 91 and 92. The command value of the duty Duty will be referred to as a command duty Duty*. The duty Duty for the switching element 31 represents a ratio, i.e., percentage, of an on duration (on time) to a total duration of each switching cycle for the switching element 31. That is, the Duty for the switching element 31 is given by the following formula (1):

$$\text{Duty (\%)} = (\text{Vin}/\text{Vsys}) \times 100 \quad (1)$$

Where Vin represents an input voltage supplied from the battery 2 and input to the converter 21.

That is, the command duty Duty* is a value of the duty Duty required to converge the deviation between the system-voltage command value Vsys* and the value of the system voltage Vsys presently measured based on the resistances of the resistors 91 and 92.

The carrier signal generation unit 83 generates a carrier signal CR formed from a triangle wave, and outputs the carrier signal CS to the driving signal generation unit 84. The driving signal generation unit 84 compares in amplitude between the command duty Duty* computed by the command duty computation unit 82 and the carrier signal CR generated by the carrier signal generation unit 83.

In addition, the driving signal generation unit 84 generates gate signals Sq1 and Sq2, i.e., pulse signals, based on the comparison result. The gate signals Sq1 and Sq2 are signals which are respectively input to the gates of the switching elements 31 and 32. If the gate signals Sq1 and Sq2 represent ON, the switching element 31 and the switching element 32 are switched ON. If the gate signals Sq1 and Sq2 represent OFF, the switching element 31 and the switching element 32 are switched OFF.

Specifically, the driving signal generation unit 84 sets for instance, the gate signal Sq1 ON and the gate signal Sq2 OFF if the carrier signal CR is smaller in amplitude than the command duty Duty*. The driving signal generation unit 84 also sets the gate signal Sq1 OFF and the gate signal Sq2 ON if the carrier signal CR is equal to or more in amplitude than the command duty Duty*. The driving signal generation unit 84 outputs the generated gate signals Sq1 and Sq2 respectively to the gates of the switching element 31 and the switching element 32 of the converter 21. Hence, the switching element 31 and the switching element 32 perform the switching operations based on the gate signals Sq1 and Sq2. That is, the driving signal generation unit 84 controls the switching operations of the switching element 31 and the switching element 32 with a PWM (Pulse Width Modulation) control.

In the embodiment, the driving signal generation unit 84 generates the gate signals Sq1 and Sq2 to avoid simultaneous ON-states of the switching elements 31 and 32. In the embodiment, the driving signal generation unit 84 generates the gate signals Sq1 and Sq2 having dead time such that one of the switching elements 31 and 32 is switched on after lapse of the dead time since the switch-off timing of the other thereof.

The aforementioned computations of the functional units 81 to 84 of the control unit 80 control the switching operations of the switching element 31 and the switching element 32 of the converter 21. This control increases the input voltage Vin from the battery 2 up to the system-voltage command value Vsys*, and outputs, as the system voltage Vsys, the increased input voltage Vin to the inverter unit 22, i.e., the first rotating electrical machine 11 and the second rotating electrical machine 12.

Additionally, the control unit 80 controls the switching operations of the switching elements 41 to 46 and 61 to 66 of the first and second inverters 40 and 60, thus individually controlling the rotational speeds of the respective first and second rotating electrical machines 11 and 12.

Next, upper-limit computing task for the system voltage Vsys is described as follows.

Figure 4:
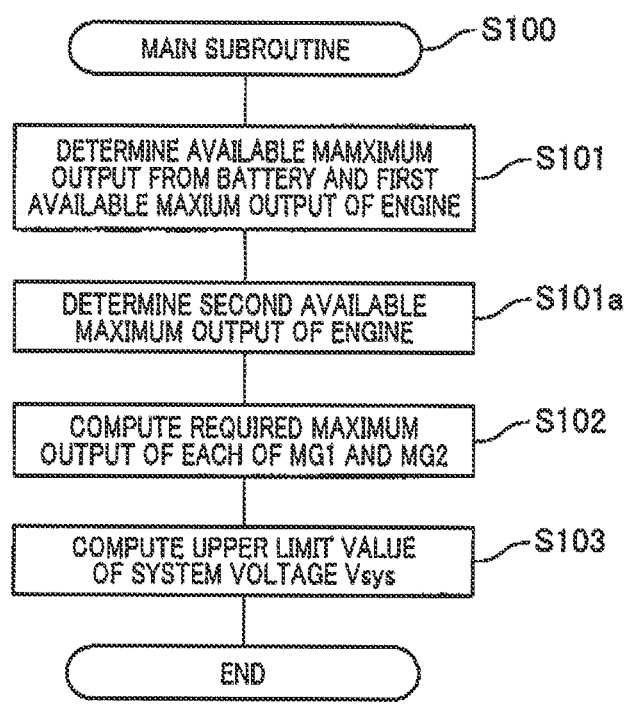
FIG. 4 is a flowchart schematically illustrating a main routine, carried out by the control unit, related to a computation of an upper limit value of a system voltage output from the converter according to the embodiment of the present disclosure.

When an ignition switch installed in the vehicle 1 is turned on, the control unit 80 starts a main routine, which is a set of one or more programs stored in the ROM and/or RAM, for the upper-limit computing task (see step S100 in FIG. 4).

When starting the main routine, at step 2101, the control unit 80 determines an available maximum output from each of the power sources, i.e., the battery 2 and the engine 4. That is, the maximum output of each of the battery 2 and the engine 4 changes due to change in one or more factors. Thus, the control unit 80 determines the available maximum output from each of the battery 2 and the engine 4.

First, at step S101, the control unit 80 obtains a current value of the available maximum output of the battery 2. For example, the control unit 80 has a map M1 in data-table format stored therein, or in a mathematical expression format or a program format implemented in the main routine. The map M1 includes a function, i.e., a correlation, of the available maximum output Woutmax (units: W or kW) with respect to the temperature of the battery 2, i.e., battery temperature, illustrated as a graph in FIG. 5. Note that, in the graph illustrated in FIG. 5, the horizontal axis represents the battery temperature, and the vertical axis represents the available maximum output Woutmax of the battery 2.

Specifically, the positive side of the vertical axis represents the available maximum output that can be discharged from the battery 2, and the negative side of the vertical axis represents the available maximum output that can be charged into the battery 2.

Figure 5:
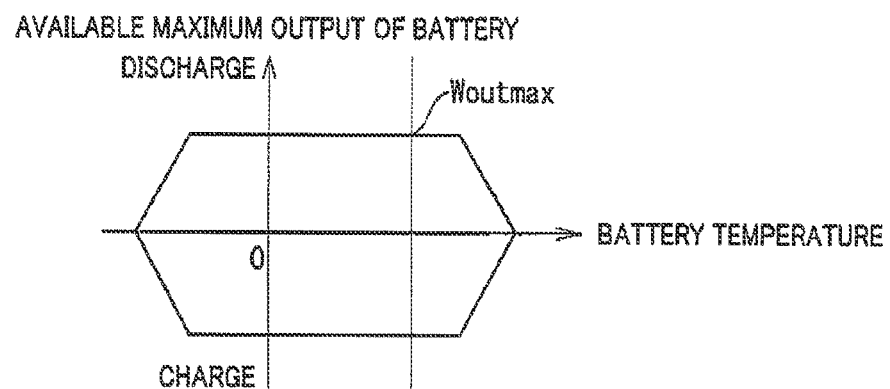
FIG. 5 is a graph schematically illustrating characteristics of an available maximum output of a battery installed in the vehicle related to the battery temperature.

As illustrated in FIG. 5, the available maximum output of the battery 2 changes with change of the battery temperature. This is because an internal resistance of the battery 2 changes depending on the battery temperature, so that it is necessary to limit the output of the battery 2 in order to prevent overcharging and overdischarging of the battery 2. Hence, in the embodiment, the control unit 80 limits the output of the battery 2 based on the battery temperature to be lower than the available maximum output.

At step S101, the control unit 80 also obtains a current value of the available maximum output power of the engine 4. Note that the output, i.e., output power, of the engine 4 represents the horsepower (units: W or kW) as an example of the ability of the engine 4 to perform work.

The control unit 80 functionally includes a first unit 80a that serves as, for example, a reducing unit that reduces the available maximum output of the engine 4 from a rated maximum output of the engine 4 by a predetermined level based on the operating conditions of the engine 4. The operating conditions of the engine 4 include how many cylinders of the engine 4 are being activated (in other words, how many cylinders are being deactivated), the temperature of a catalyst installed in the engine 4, and/or the like. The catalyst is configured to control emissions exhausted from the engine 4. The reduction of the available maximum output of the engine 4 from the rated maximum output aims to protect components installed in the engine 4, and meet fuel economy requirements.

Specifically, the first unit 80a is configured to limit a current value of the available maximum output of the engine 4 to be lower than the rated maximum output of the engine 4. For instance, the control unit 80 has a map M2 in data-table format stored therein, or in a mathematical expression format or a program format implemented in the main routine (see FIG. 6). The map M2 includes a function, i.e., a correlation, of the available maximum output of the engine 4 with respect to the catalyst temperature illustrated as a graph in FIG. 6.

Figure 6:
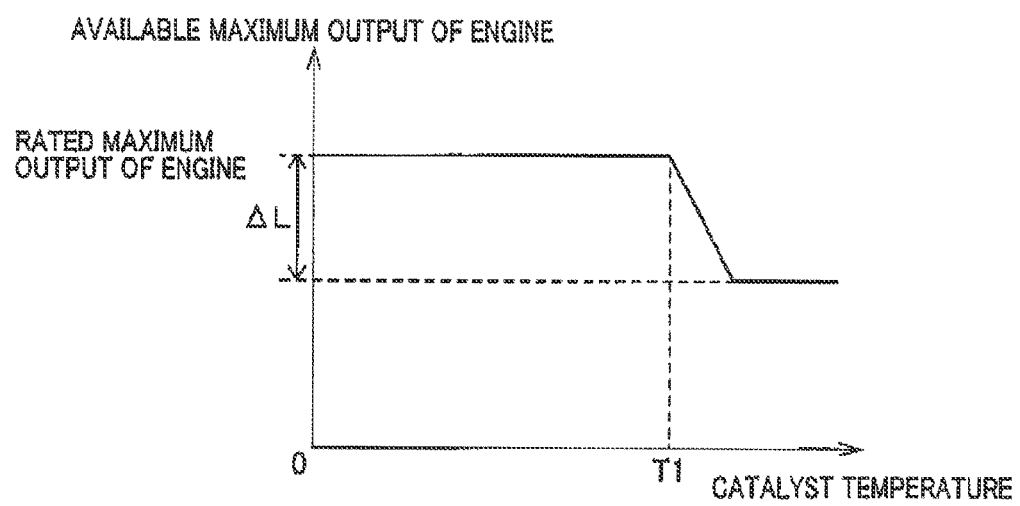
FIG. 6 is a graph schematically illustrating a function of an available maximum output of an engine installed in the vehicle with respect to the catalyst temperature.

Referring to FIG. 6, when the catalyst temperature is lower than a temperature T1, the first unit 80a maintains a value of the available maximum output of the engine 4 at the rated maximum output of the engine 4 based on the function of the map M2. In contrast, when the catalyst temperature is equal to or higher than the temperature T1, the first unit 80a determines a value of the available maximum output of the engine 4 to be lower by predetermined level ΔL than the rated maximum output of the engine 4 based on the function of the map M2.

Figure 7:
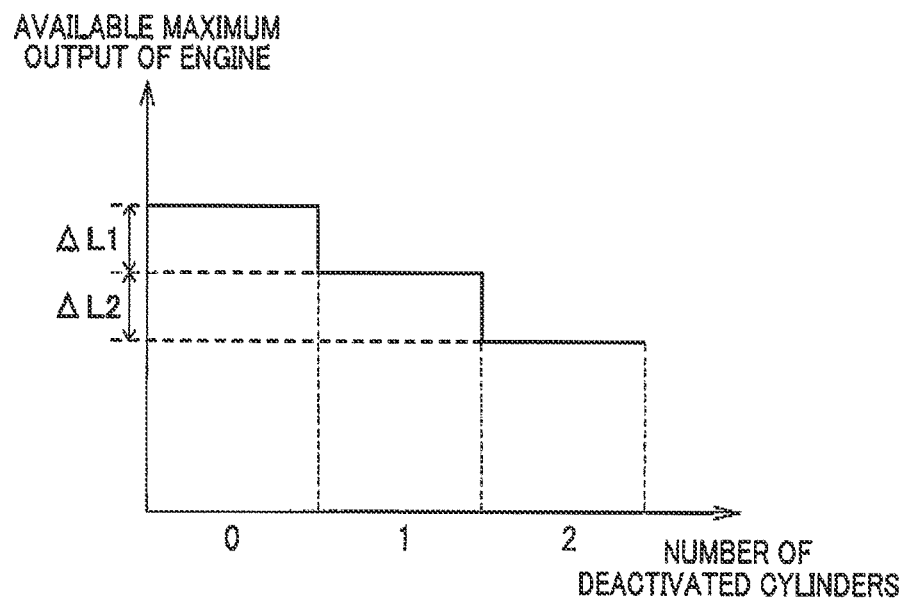
FIG. 7 is a graph schematically illustrating a function of the available maximum output of the engine with respect to the number of cylinders being deactivated.

Additionally, the control unit 80 has a map M3 in data-table format stored therein, or in a mathematical expression format or a program format implemented in the main routine (see FIG. 7). The map M3 includes a function, i.e., a correlation, of the available maximum output of the engine 4 with respect to the number of cylinders being deactivated illustrated as a graph in FIG. 7.

Specifically, referring to FIG. 7, when the number of cylinders being deactivated is set to zero, the first unit 80a maintains a value of the available maximum output of the engine 4 at the rated maximum output of the engine 4 based on the function of the map M3. In contrast, when the number of cylinders being deactivated is set to one, the first unit 80a determines a first value of the available maximum output of the engine 4 to be lower by predetermined level ΔL1 than the rated maximum output of the engine 4 based on the function of the map M3. In addition, when the number of cylinders being deactivated is set to two, the first unit 80a determines a second value of the available maximum output of the engine 4 to be lower by predetermined level ΔL2 than the rated maximum output of the engine 4 based on the function of the map M3.

As described above, at step S101, the first unit 80a is configured to possibly control the operating conditions of the engine 4 to thereby limit the available maximum output of the engine 4 to be lower than the rated maximum output of the engine 4. Hereinafter, the available maximum output of the engine 4 limited to be lower than the rated maximum output of the engine 4 based on positive control of the operating conditions of the engine 4 will be referred to as first available maximum output of the engine 4.

In other words, the first unit 80a calculates a first output reduction rate, which represents the rate of decrease of the rated maximum output of the engine 4 per unit time down to a value of the maximum output voltage of the engine 4. Then, the first unit 80a multiplies the rated maximum output power of the engine 4 by the first output reduction rate, thus computing a value of the first available maximum output power of the engine 4.

Figure 8:
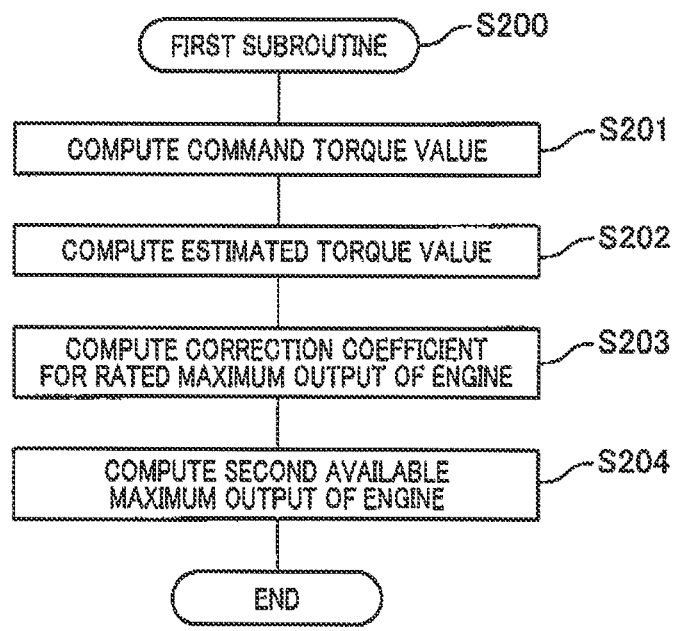
FIG. 8 is a flowchart schematically illustrating a first subroutine, called by the main routine, related to a computation for a value of the available maximum output of the engine that is naturally reduced according to the embodiment of the present disclosure.

Next, at step S101a, the control unit 80, which includes a second unit 80b, calls a first subroutine, which is a set of one or more programs stored in the ROM and/or RAM. Then, the second unit 80b executes the first subroutine at step S200 illustrated in FIG. 8 to serve as a reduction rate calculating unit that obtains a value of the available maximum output of the engine 4 that is reduced from the rated maximum output of the engine 4 without the driver's intention.

When starting the first subroutine, the second unit 80b computes a command value of torque for instructing the engine 4 to generate the command value of torque; the command value of torque will be referred to as a command torque value Te* of the engine 4 at step S201. In detail, the second unit 80b computes the command torque value Te* based on requested power Pe* for the engine 4 and the rotational speed Ne of the engine 4 in accordance with the following formula (2):

$$Te^* = Pe^*/Ne \quad (2)$$

Where the requested power Pe* represents power, i.e., horsepower, that the engine 4 is requested to generate.

After step S201 is completed, the first subroutine transfers to step S202.

At step S202, the second unit 80b computes an estimated value of torque that the engine 4 generates; the estimated value of torque will be referred to as an estimated torque value Tee.

In the embodiment, the first rotating electrical machine 11 controls the rotational speed thereof, thus controlling the rotational speed of the engine 4 at a target rotational speed described later.

Figure 9:
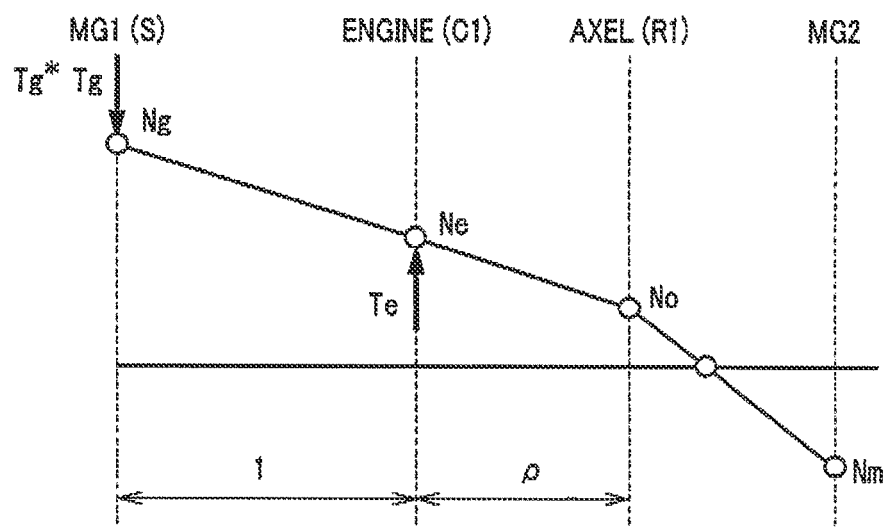
FIG. 9 is a collinear diagram schematically illustrating relative relationships among the rotational speeds of 1. A first rotating electrical machine corresponding to a sun gear
2. The engine corresponding to a carrier
3. An axle corresponding to a ring gear.

FIG. 9 is a collinear diagram schematically illustrating the relative relationships among the rotational speeds of 1. The first rotating electrical machine (MG1) 11 corresponding to the sun gear (see S1 in FIG. 9)
2. The engine 4 corresponding to the carrier (see C1 in FIG. 9)
3. The axle 7 corresponding to the ring gear (see R1 in FIG. 9).

In FIG. 9, the vertical axis represents the rotational speeds of the respective rotating elements (S1, C1, and R1), and the horizontal axis represents the number of gears of the respective rotating elements (S1, C1, and R1).

Reference characters Ng, Ne, No, and Nm respectively represent the rotational speed of the first rotating electrical machine 11, the rotational speed of the engine 4, the rotational speed of the axle 7, and the rotational speed of the second rotating electric motor 12. As illustrated in FIG. 9, the rotational speed Ng of the first rotating electrical machine 11, the relationship among the rotating speed Ne of the engine 4, and the rotational speed No of the second rotating electrical machine 12 are expressed as a straight line. In other words, the rotational speed Ng of the first rotating electrical machine 11, the rotating speed Ne of the engine 4, and the rotational speed No of the second rotating electrical machine 12 are changed while a linear relationship thereamong is maintained.

The relationship illustrated in FIG. 9 establishes the following formula (3) for the estimated torque value Te of the engine 4:

$$Te = \{-(1+\rho)/\rho\} \times Tg^* \quad (3)$$

Where Tg* represents a command value of torque of the first rotating electrical machine 11, which will be referred to as a command torque value Tg*.

After step S202 is completed, the first subroutine transfers to step S203.

At step S203, the second unit Sob computes a correction coefficient K of the maximum output power of the engine 4. In detail, the second unit 80b computes the correction coefficient K for the rated maximum output of the engine 4 in accordance with the following formula (4) based on the command torque value Te* of the engine 4 obtained in step S201 and the estimated torque value Te of the engine 4 obtained in step S202:

$$K = f(Te/Te^*) \quad (4)$$

Hereinafter the estimated torque value Te divided by the command torque value Te* of the engine 4 will be referred to as a ratio Te/Te*.

Specifically, the second unit 80b computes the correction coefficient K for the rated maximum output of the engine 4 based on the ratio of the estimated torque value Te of the engine 4 to the command torque value Te* of the engine 4.

Figure 10:
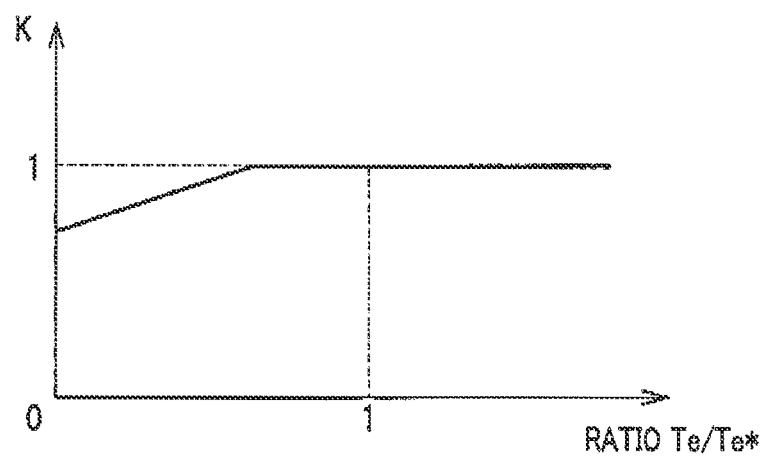
FIG. 10 is a graph schematically illustrating a relationship between a correction coefficient for a rated maximum output of the engine and a ratio of an estimated torque value to a torque command value according to the embodiment of the present disclosure.

FIG. 10 schematically illustrates the relationship between the correction coefficient K for the rated maximum output of the engine 4 and the ratio Te/Te*.

After step 9203 is completed, the first subroutine transfers to step S204.

At step S204, the second unit 80b computes a value of the available maximum output of the engine 4. In detail, the second unit 80b multiplies the rated maximum output of the engine 4 by the correction coefficient K for the rated maximum output of the engine 4 computed at step S200, thus computing a value of the available maximum output of the engine 4; the value of the available maximum output is limited to be lower than the rated maximum output of the engine 4.

After step S204 is completed, the first subroutine returns to the main routine.

Specifically, at step S200, the second unit 80a computes, based on the ratio Te/Te*, the value of the available maximum output power of the engine 4, which is reduced from the rated maximum output of the engine 4 independently of the driver's intention. For example, any factors may cause the estimated torque value Te of the engine 4 to differ from the command torque value Te* independently of the driver's intention. Hereinafter, the available maximum output of the engine 4 reduced from the rated maximum output of the engine 4 independently of the driver's intention will be referred to as second available maximum output of the engine 4.

In other words, at step S200, the second unit 80b calculates an output reduction rate, which represents the rate of decrease of the rated maximum output of the engine 4, based on the ratio Te/Te* of the estimated torque value Te of the engine 4 to the command torque value Te* of the engine 4. Then, at step S200, the second unit 80b multiplies the rated maximum output of the engine 4 by the output reduction rate, thus computing a value of the second available maximum output of the engine 4.

After the first subroutine in step S101 is completed, the main routine transfers to step S102 (see FIG. 4).

At step S102, the control unit 80 computes required maximum output, i.e., output power, of the first rotating electrical machine 11 (MG1), and required maximum output, i.e., output power, of the second rotating electrical machine 12 (MG2).

Figure 11:
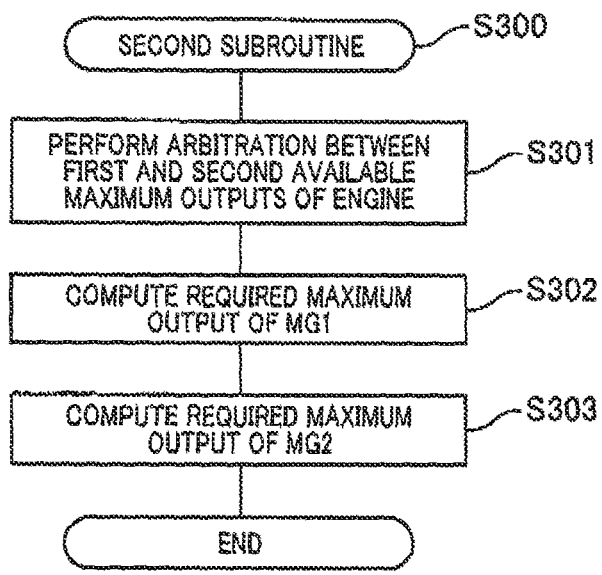
FIG. 11 is a flowchart schematically illustrating a second subroutine, called by the main routine, related to computations of required maximum outputs of the first and second rotating electrical machines according to the embodiment of the present disclosure.

In detail, the control unit 80 includes a third unit 80c for computing the required maximum output of the first rotating electrical machine 11 and the required, maximum output of the second rotating electrical machine 12. The third unit 80c calls a second subroutine, which is a set of one or more programs stored in the ROM and/or RAM at step S102. Then, the third unit 80c executes the second subroutine at step S300 illustrated in FIG. 11 to thereby obtain the required maximum output of the first rotating electrical machine 11 and the required maximum output of the second rotating electrical machine 12.

When starting the second subroutine, the third unit 80c performs, at step S301, an arbitration between the value of the first available maximum output of the engine 4 reduced by the first unit 80a at step S101, and the value of the second available maximum output of the engine 4 calculated at step S101a (S200). Specifically, the third unit 80c compares the value of the first available maximum output of the engine 4 with the value of the second available maximum output of the engine 4. Based on the results of the comparison, the third unit 80c selects one of the value of the first available maximum output of the engine 4 and the value of the second available maximum output of the engine 4; the selected one is lower than the other. Then, the third unit 80c determines the selected one of the value of the first available maximum output of the engine 4 and the value of the second available maximum output of the engine 4 as an arbitrated, i.e., selected, available maximum output of the engine 4. Specifically, the third unit 80c serves as a selecting unit that selects one of the value of the first available maximum output of the engine 4 and the value of the second available maximum output of the engine 4.

That is, each of the required maximum output of the first rotating electrical machine 11 and the required maximum output of the second rotating electrical machine 12 is required to implement the selected available maximum output of the engine 4.

After step S301 is completed, the second subroutine transfers to step S302.

At step S302, the control unit 80, which functionally includes a fourth unit 80d, computes the required maximum output of the first rotating electrical machine 11 (MG1).

Figure 12:
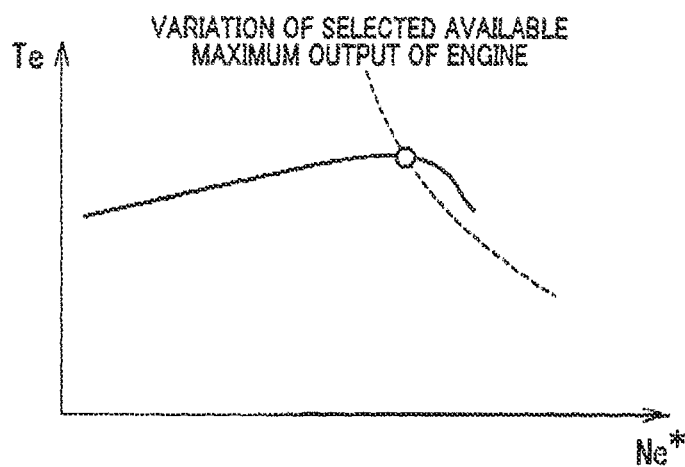
FIG. 12 is a graph schematically illustrating a function of operating points of the engine with respect to a variation of a selected available maximum output of the engine according to the embodiment of the present disclosure.

First, the fourth unit 80d determines an operating point of the engine 4 when the output of the engine 4 is set to the selected available maximum output of the engine 4; the operating point of the engine 4 has a target rotational speed Nemax and target torque Temax. For example, the control unit 80 has a map M4 in data-table format stored therein, or in a mathematical expression format or a program format implemented in the second subroutine (see FIG. 12). The map M4 includes a function, i.e., a correlation, of operating points of the engine 4 with respect to a variation of the selected available maximum output of the engine 4 illustrated as a graph in FIG. 12.

Specifically, the fourth unit 80d refers to the map M4 using a value of the selected available maximum output of the engine 4 as a key. Based on the results of the reference, the fourth unit 80d retrieves an operating point P having a target rotational speed Nemax and target torque Temax, which will be referred to as P(Nemax, Temax), corresponding to the value of the selected available maximum output of the engine 4. In other words, the fourth unit 80d obtains the operating point P(Nemax, Temax), corresponding to the value of the selected available maximum output of the engine 4 in accordance with the following formula (5):

$$P(Temax, Nemax) = f(I) \tag{5}$$

Where I represents the value of the selected available maximum output of the engine 4.

Next, the fourth unit 80d calculates the current rotational speed Ng of the first rotating electrical machine 11 based on
1. The current rotational speed No of the axle 7
2. The target rotational speed Nemax at the operating point P corresponding to the value of the selected available maximum output of the engine 4
3. The collinear diagram illustrated in FIG. 9
4. The following formula (6):

$$Ng\{(1+\rho)/\rho\} \times Nemax \tag{6}$$

Additionally, the fourth unit 80d calculates actual output torque Tg of the first rotating electrical machine 11 based on 1. The target torque Temax at the operating point F corresponding to the value of the selected available maximum output of the engine 4
2. The collinear diagram illustrated in FIG. 9
3. The following formula (7):

$$Tg=\{-\rho/(1+\rho)\}\times Te\max \quad (7)$$

Then, the control unit 80 computes the required maximum output, referred to as Pgmax, (units: W or kW) in accordance with
1. The rotational speed Ng and the actual output torque Tg of the first rotating electrical machine 11 calculated in accordance with the respective formulas (6) and (7)
2. The following formula (8):

$$Pg\max=Ng\times Tg\times 2\pi/60 \quad (8)$$

After step S302 is completed, the subroutine proceeds to step S303.

At step A303, the fourth unit 80d computes the required maximum output, referred to Pmmax, (units: W or kW) of the second rotating electrical machine 12.

In detail, the control unit 80 computes the required maximum output Pmmax of the second rotating electrical machine 12 in accordance with the following formula (9), the available maximum output Woutmax of the battery 2, determined at step S101 and the required maximum output Pgmax of the first rotating electrical machine 11 calculated in accordance with the formula (8):

$$Pm\max=W\text{out}\max-Pg\max \quad (9)$$

After step S303 is completed, the second subroutine returns to the main routine, After step S102 is completed, the main routine transfers to step S103 (see FIG. 4).

Figure 13:
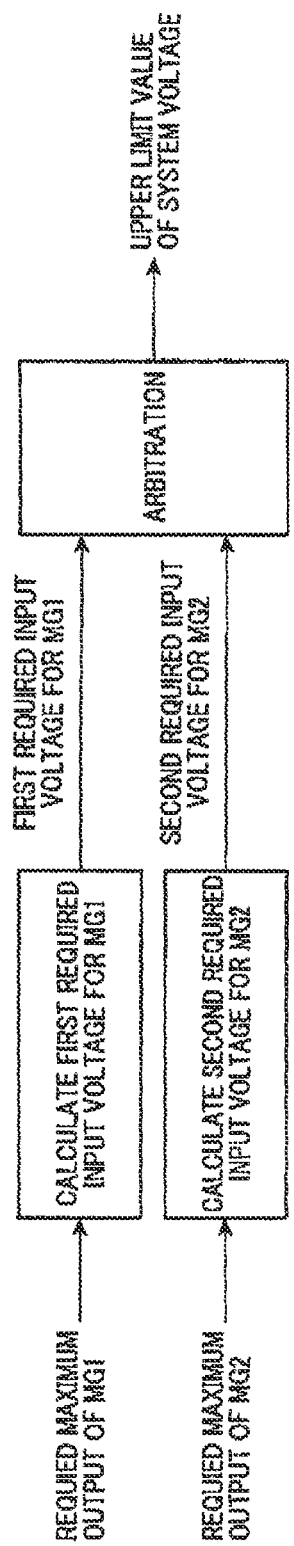
FIG. 13 is a block diagram schematically illustrating a procedure for computing, by the control unit, the upper limit value of the system voltage according to the embodiment of the present disclosure.
Figure 14A:
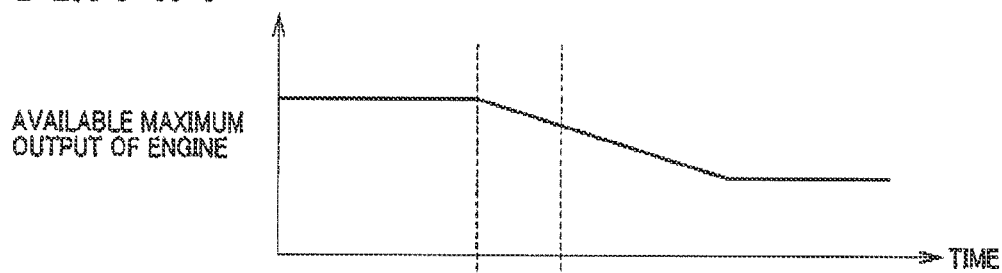
FIGS. 14A to 14D are a joint timing chart schematically illustrating how an available maximum output of the engine, the required maximum outputs of the first and second rotating electrical machines, and the system voltage change over time while the main routine is executed by the control unit.
Figure 14B:
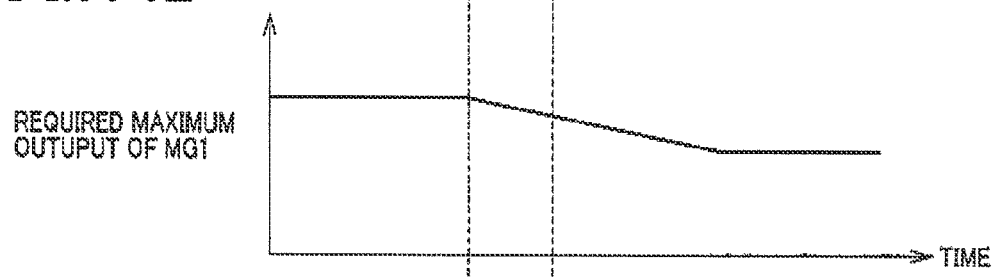
Figure 14C:
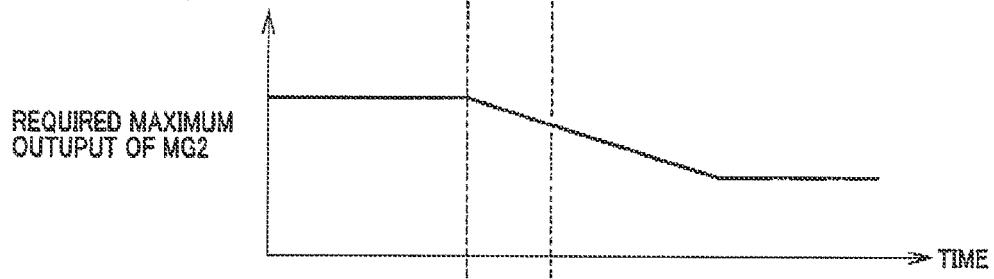
Figure 14D:
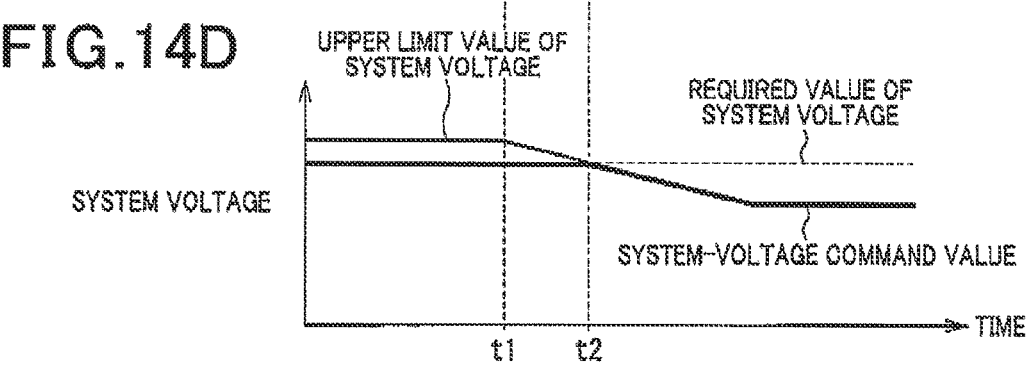

At step S103, the control unit 80, which functionally includes a fifth unit 80e, computes an upper limit value of the system voltage Vsys, In detail, as illustrated in FIG. 13, the fifth unit 80e of the control unit 80 calculates a first required input voltage for the first rotating electrical machine 11 based on the required maximum output Pgmax of the first rotating electrical machine 11. The first required input voltage of the first rotating electrical machine 11 is required for the first rotating electrical machine 11 to serve as a motor to implement the required maximum output Pgmax thereof. The fifth unit 80e also calculates a second required input voltage of the second rotating electrical machine 12 based on the required maximum output Pmmax of the second rotating electrical machine 12. The second required input voltage for the second rotating electrical machine 12 is required for the second rotating electrical machine 12 to serve as a motor to implement the required maximum output Pmmax thereof.

Then, the fifth unit 80e performs an arbitration between the first required input voltage for the first rotating electrical machine 11 and the second required input voltage for the second rotating electrical machine 12. Specifically, the fifth unit 80e compares the first required input voltage for the first rotating electrical machine 11 with the second required input voltage for the second rotating electrical machine 12. Based on the results of the comparison, the fifth unit 80e selects one of the first required input voltage for the first rotating electrical machine 11 and the second required input voltage for the second rotating electrical machine 12 as the tipper limit value of the system voltage Vsys, For example, the third to fifth units 80c to 80e serve as a first calculating unit that calculates an upper limit for an increased voltage output from the converter 21 based on the value of the first available maximum output of the engine 4 if the second available maximum output of the engine 4 is not considered.

In addition, the third to fifth units 80c to 80e serve as, for example, a second calculating unit that calculates an upper limit for an increased voltage output from the converter 21 based on the value of the second available maximum output of the engine 4 if the first available maximum output of the engine 4 is not considered.

Particularly, the fourth and fifth units 80d and 80e serve as, for example, a calculating unit that calculates an upper limit for an increased voltage output from the converter 21 based on the selected value of one of the first available maximum output of the engine 4 and the second available maximum output of the engine 4.

After step S103 is completed, the main routine is terminated. The control unit 80 carries out the main routine at step S100 repeatedly while the ignition switch is in an ON-state. Hence, the control unit 80 repeatedly carries out the main routine at step S100 while the ignition switch is in the ON-state.

As described above, the control unit 80 serves as a limit unit comprised of the first to fifth units 80a to 80e to perform the main routine at step S100, thus limiting a value of the system voltage Vsys corresponding to the output voltage of the converter 21 to be equal to or lower than the upper limit value determined at step S103. Thus, the control unit 80 functions as a unit limiting the system voltage Vsys.

Next, an example of how parameters change over time while the main routine is executed by the ECU 10 will be described based on FIGS. 14A to 14D. The parameters include the first or second available maximum output of the engine 4, the required maximum output of the first rotating electrical machine 11, the required maximum output of the second rotating electrical machine 12, and the system voltage Vsys.

After time t1, the required maximum outputs of the first and second rotating electrical machines 11 and 12 reduce due to a reduction in the available maximum output of the engine 4. This results in a reduction in the upper limit value of the system voltage Vsys.

Until time t2 after the time t1, the system-voltage command value Vsys* becomes equivalent to the required value of the system voltage Vsys because the upper limit value of the system voltage Vsys is larger than the required value of the system voltage Vsys.

After time t2, the upper limit value of the system voltage Vsys decreases due to a further reduction in the available maximum output of the engine 4. The system-voltage command value Vsys* is limited to be equal to or lower than the upper limit value of the system voltage Vsys if the upper limit value of the system voltage Vsys becomes smaller than the required value of the system voltage Vsys, resulting in the system-voltage command value Vsys* being lower than the required value of the system voltage Vsys.

To sum up, the ECU 10 limits the system voltage Vsys, which is the output voltage of the converter 21 to the inverter unit 22, i.e., each of the first and second rotating electrical machines 11 and 12, to be equal to or lower than the upper limit value thereof according to the reduction in the available maximum output of the engine 4. This limitation reduces switching losses of the switching elements 31 and 32 in the converter 21. The limitation of the system voltage Vsys further reduces switching losses of the switching elements 41 to 46 in the first inverter 40 and the switching elements 61 to 66 in the second inverter 60. Therefore, the ECU 10 reduces power losses of each of the converter 21 and the inverter unit 22 due to their converting operations, thus improving fuel economy of the vehicle 1.

As above described, the control device, i.e., the ECU 10 including the control unit 80 according to the embodiment is installed in the vehicle 1; the vehicle 1 includes the battery 2, the wheels 3, the engine 4, the first rotating electrical machine 11, the second rotating electrical machine 12, and the converter 21.

The engine 4 is capable of producing rotational driving force to the wheels 3. Each of the first rotating electrical machine 11 and the second rotating electrical machine 12 performs the power-running operation based on power supplied from the battery 2, which serves as a power source installed in the vehicle 1, thus outputting torque, i.e., rotating a rotor thereof. Additionally, each of the first rotating electrical machine 11 and the second rotating electrical machine 12 is also capable of performing the regenerative operation based on input torque supplied from a corresponding one of the engine 4 and the wheels 3, thus charging the battery 2.

The converter 21 includes the switching elements 31 and 32. The control unit 80 of the ECU 10 controls the switching elements 31 and 32, so that the converter 21 increases the voltage supplied from the battery 2, and outputs the increased voltage to each of the first and second rotating electrical machines 11 and 12.

The control unit 80 includes means for limiting, based on change of the available maximum output of the engine 4, the system voltage Vsys as the output voltage from the converter 21. The limiting of the system voltage Vsys reduces the switching losses of the switching elements 31 and 32 when the available maximum output of the engine 4 is reduced, thus reducing power loss of the converter 21 due to its conversion operations. Consequently, the control unit 80 improves the fuel economy of the vehicle 1.

Additionally, the inverter unit 22, i.e., the first inverter 40 and the second inverter 60, which include the switching elements 41 to 46 and the switching elements 61 to 66, rotationally drive the first and second rotating electrical machines 11 and 12.

The converter 21 increases, according to the available maximum power of the engine 4, the voltage supplied from the battery 2, and outputs the increased voltage to the inverter unit 22, i.e., the first and second inverters 40 and 60. Then, the converter 21 outputs the increased voltage to the first inverter 40 for the first rotating electrical machine 11 and the second inverter 60 for the second rotating electrical machine 12.

Hence, the inverter unit 22, i.e., the first inverter 40 and the second inverter 60, reduces the switching losses of the switching elements 41 to 46 and 61 to 66 when the available maximum output of the engine 4 is reduced, thus reducing the power losses due to the converting operations of the inverter unit 22. This results in further improvement of the fuel economy of the vehicle 1.

Moreover, the operating conditions of the engine 4 where the available maximum output of the engine 4 may be reduced include, for instance, at least one of 1. A situation where friction of the engine 4 is greater than normal before the engine 4 has been warmed up 2. A situation where the output of the engine 4 is limited at a high temperature of the catalyst or the engine 4

3. A situation where the output of the engine 4 is limited when the number of activated cylinders in the engine 4 is reduced, i.e., when there is at least one deactivated cylinder in the engine 4.

Moreover, the control unit 80 according to the embodiment additionally reduces the available maximum output of the engine 4 from the rated maximum output of the engine 4 by a predetermined level, thus limiting the available maximum output of the engine 4 to be lower than the rated maximum output of the engine 4 as the first available maximum output of the engine 4. Then, the control unit 80 determines the upper limit value of the output voltage, i.e., the system voltage Vsys, of the converter 21 based on the first available maximum output of the engine 4. The control unit 80 limits the output voltage, i.e., the system voltage Vsys, of the converter 21 to be equal to or lower than the determined upper limit value.

This configuration limits the system voltage Vsys to be equal to or lower than the upper limit value according to the first available maximum output of the engine 4; the first available maximum output of the engine 4 is reduced from the rated maximum output of the engine 4 based on possible control of the operating conditions of the engine 4.

In addition, the control unit 80 calculates the output reduction rate, which represents the rate of decrease of the rated maximum output of the engine 4, based on the ratio Te/Te* of the estimated torque value Te of the engine 4 to the command torque value Te* of the engine 4. Then, the control unit 80 multiplies the rated maximum output power of the engine 4 by the output reduction rate, thus computing a value of the available maximum output of the engine 4 as the second available maximum output of the engine 4, Then, the control unit 80 determines the upper limit value of the output voltage, i.e., the system voltage Vsys, of the converter 21 based on the second available maximum output of the engine 4. The control unit 80 limits the output voltage, i.e., the system voltage Vsys, of the converter 21 to be equal to or lower than the determined upper limit value.

This configuration limits the system voltage Vsys to be equal to or lower than the upper limit value according to the second available maximum output of the engine 4; the second available maximum output of the engine 4 is naturally reduced from the rated maximum output of the engine 4.

The control unit 80 according to the embodiment functions as, for example, means for (1) Multiplying the rated maximum output of the engine 4 by the output reduction rate to obtain the available maximum output of the engine 4

(2) Limiting the output voltage, i.e., the system voltage Vsys based on a current value of the available maximum output of the engine 4.

In above stated embodiment, the control unit 80 calculates, at step S200, the output reduction rate, which represents the rate of decrease of the rated maximum output of the engine 4 per unit time, based on the ratio Te/Te* of the estimated torque value Te of the engine 4 to the command torque value Te* of the engine 4. Then, the control unit 80 multiplies the rated maximum output power of the engine 4 by the output reduction rate, thus computing a value of the second available maximum output of the engine 4.

The present disclosure is however not limited to these processes.

Specifically, the control unit 80 according to a first modification of the embodiment can calculate, at step S200, the output reduction rate based on the deviation between the estimated torque value Te of the engine 4 and the command torque value Te* of the engine 4.

The control unit 80 according to a second modification of the embodiment can be configured to maintain, i.e., not to reduce, the available maximum output of the engine 4 from the rated maximum output of the engine 4 even if the number of activated cylinders in the engine 4 is reduced and/or the catalyst temperature is equal to or higher than the temperature T1.

The control unit 80 according to the embodiment computes the command duty Duty* based on the system voltage Vsys measured by the resistors 91 and 92 serving as a current sensor, and controls the converter 21 using the command duty Duty*. The present disclosure is however not limited to the configuration. Specifically, the control unit 80 according to a third modification of the embodiment can be configured to estimate the system voltage Vsys based on, for example, a current flowing through the inductor 23 and the inductance 1, of the inductor 23. Then, the control unit 80 can compute the command duty Duty* based on the estimated system voltage Vsys. This configuration of the control unit 80 according to the third modification makes it possible to eliminate, from the vehicle V, the resistors 91 and 92 serving as a current sensor.

The third unit 80c of the control unit 80 is configured to select one of the value of the first available maximum output of the engine 4 and the value of the second available maximum output of the engine 4; the selected one is lower than the other at step S301. Then, the third unit 80c is configured to determines the selected one of the value of the first available maximum output of the engine 4 and the value of the second available maximum output of the engine 4 as an arbitrated, i.e., selected, available maximum output of the engine 4. The present disclosure is however not limited to the configuration.

Specifically, at step S301, the third unit 80c can be configured to calculate the sum of the value of the first available maximum output of the engine 4 and the value of the second available maximum output of the engine 4. Then, the third unit 80c can be configured to determine the sum of the value of the first available maximum output of the engine 4 and the value of the second available maximum output of the engine 4 as an arbitrated, i.e., selected, available maximum output of the engine 4.

The capacitors 24 and 25 can be eliminated from the vehicle 1.

Each of the first and second rotating electrical machines 11 and 12 is not limited to a three-phase brushless motor, and can be designed as a single-phase or multiphase brushless motor, or a single-phase or multiphase brushed motor.

The switching elements of the converter 21 and the inverter unit 22 according to the embodiment are designed as IGBTs, but can be designed as MOS-FETs, transistors, and others.

The vehicle control system CS may not include the inverter unit 22, and may directly output the increased voltage from the converter 21 to the first rotating electrical machine 11 and the second rotating electrical machine 12.

While an illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A control device comprising:
a control unit configured to control at least one switching element of a converter to increase a voltage supplied from a battery, thus outputting the increased voltage to a rotating electrical machine, the rotating electrical machine being capable of driving, based on the increased voltage output from the converter, an internal combustion engine, and capable of charging the battery based on torque supplied from the internal combustion engine; and
a limit unit configured to limit, based on an available maximum output of the internal combustion engine, the increased voltage output from the converter to be equal to or lower than a predetermined upper limit.

2. The control device according to claim 1, wherein:
the control unit is configured to output the increased voltage to a second rotating electrical machine in addition to the rotating electrical machine, the second rotating electrical machine being capable of driving, based on the increased voltage output from the converter, an axle of a vehicle, and capable of charging the battery based on torque supplied from the axle.

3. The control device according to claim 2, wherein:
the limit unit further comprises:
an available maximum output calculating unit that calculates a value of a first available maximum output of the internal combustion engine based on a rated maximum output of the internal combustion engine; and
a first calculating unit configured to calculate the upper limit for the increased voltage output from the converter based on the value of the first available maximum output of the internal combustion engine.

4. The control device according to claim 2, wherein:
the limit unit further comprises:
a reduction rate calculating unit configured to:
calculate an output reduction rate based on a ratio of an estimated torque value of the internal combustion engine to a command torque value of the internal combustion engine, the output reduction rate representing a rate of decrease of a rated maximum output of the internal combustion engine; and
multiply the rated maximum output of the internal combustion engine by the output reduction rate, thus calculating a value of a second available maximum output of the internal combustion engine; and
a second calculating unit configured to calculate the upper limit for the increased voltage output from the converter based on the value of the second available maximum output of the internal combustion engine.

5. The control device according to claim 2, wherein:
the limit unit further comprises:
an available maximum output calculating unit configured to calculate a value of a first available maximum output of the internal combustion engine based on a rated maximum output of the internal combustion engine;
a reduction rate calculating unit configured to:
calculate an output reduction rate based on a ratio of an estimated torque value of the internal combustion engine to a command torque value of the internal combustion engine, the output reduction rate representing a rate of reduction of a rated maximum output of the internal combustion engine per unit time, the estimated torque value of the internal combustion engine being estimated based on actual conditions of the internal combustion engine; and multiply the rated maximum output of the internal combustion engine by the output reduction rate, thus calculating a value of a second available maximum output of the internal combustion engine;

a selecting unit configured to select one of the value of the first available maximum output of the internal combustion engine and the value of the second available maximum output of the internal combustion engine; and a calculating unit configured to calculate the upper limit for the increased voltage output from the converter based on the selected value of one of the first available maximum output of the internal combustion engine and the second available maximum output of the internal combustion engine.

6. The control device according to claim 5, wherein:

the selecting unit is configured to:

compare the value of the first available maximum output of the internal combustion engine with the value of the second available maximum output of the internal combustion engine; and select, based on a result of the comparison, one of the value of the first available maximum output of the internal combustion engine and the value of the second available maximum output of the internal combustion engine, one of the value of the first available maximum output of the internal combustion engine and the value of the second available maximum output of the internal combustion engine being smaller than the other thereof.

7. The control device according to claim 3, wherein:

the reducing unit is configured to reduce the available maximum output of the internal combustion engine from the rated maximum output of the internal combustion engine by the predetermined level according to an operating condition of the internal combustion engine as the given condition.

8. A vehicle control system comprising:

a battery;

an axle;

an internal combustion engine configured to rotatably drive the axle;

a converter including at least one switching element;

a first rotating electrical machine;

a second rotating electrical machine;

a control unit configured to control the at least one switching element of the converter to increase a voltage supplied from the battery, thus outputting the increased voltage to each of the first and second rotating electrical machines, the first rotating electrical machine being capable of driving, based on the increased voltage output from the converter, the internal combustion engine, and capable of charging the battery based on torque supplied from the internal combustion engine, the second rotating electrical machine being capable of driving, based on the increased voltage output from the converter, the axle, and capable of charging the battery based on torque supplied from the axle; and a limit unit configured to limit, based on an available maximum output of the internal combustion engine, the increased voltage output from the converter to be equal to or lower than a predetermined upper limit.

* * * * *